(12) United States Patent
Chen

(10) Patent No.: US 7,036,891 B2
(45) Date of Patent: May 2, 2006

(54) RETAINER OF A MARK CAPABLE OF RETAINING THE MARK ON A ROTATING WHEEL WITHOUT ROTATING WITH THE WHEEL

(76) Inventor: Yung-Chung Chen, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/853,367

(22) Filed: May 26, 2004

(65) Prior Publication Data

US 2005/0264091 A1 Dec. 1, 2005

(51) Int. Cl.
*B60B 7/04* (2006.01)
*G09F 21/04* (2006.01)

(52) U.S. Cl. .................. 301/37.25; 301/37.26; 40/587

(58) Field of Classification Search ........... 301/37.101, 301/37.25, 37.26, 37.102, 37.34, 37.371, 301/108.1, 108.4; 40/587
See application file for complete search history.

(56) References Cited

U.S. PATENT DOCUMENTS

| 4,280,293 | A | * | 7/1981 | Kovalenko et al. ........... 40/587 |
| 5,190,354 | A | * | 3/1993 | Levy et al. ............... 301/37.25 |
| 5,957,542 | A | * | 9/1999 | Boothe et al. ........... 301/37.25 |
| 6,443,529 | B1 | * | 9/2002 | Williams ................ 301/37.25 |
| 6,637,831 | B1 | * | 10/2003 | Kim ....................... 301/37.25 |
| 6,857,709 | B1 | * | 2/2005 | McLean et al. .......... 301/37.25 |

* cited by examiner

*Primary Examiner*—Russell D. Stormer
*Assistant Examiner*—Jason R. Bellinger

(57) ABSTRACT

A non-rotating wheel cover is disclosed. The wheel cover can be mounted on an outer side of a wheel. The wheel cover comprises a retaining plate having a bearing at a center thereof; a periphery of the retaining plate being installed with a plurality of notches to not interfere with the locking studs of the wheel; a central shaft having a screw hole; the central shaft passing through the bearing of the retaining plate; a panel; an outer surface of the panel can be installed with an indicia; a weight being installed in the panel. Thereby when the wheel moves, since the panel is retained by the bearing and the weight is located within the panel, the indicia will not rotate with respect to the rotation of the wheel.

3 Claims, 5 Drawing Sheets

RETAINER OF A MARK CAPABLE OF RETAINING THE MARK ON A ROTATING WHEEL WITHOUT ROTATING WITH THE WHEEL

FIELD OF THE INVENTION

The present invention relates to wheel covers with indicia thereon, and particularly to a wheel cover with an indicia capable of not rotating with the wheel; wherein when the wheel rotates, the indicia will not rotate with respect to the wheel so that people can see the indicia clearly.

BACKGROUND OF THE INVENTION

It is often that indicia is adhered to a cover of a wheel so as to achieve the effect of advertisement. However when the wheel rotates, the indicia will rotate with the wheel so that people cannot see the indicia clearly as the vehicle having the wheel moves. Thereby the advertisement effect is only effective when the vehicle does not move. Thus the effect of advertisement is reduced.

SUMMARY OF THE INVENTION

Accordingly, the primary object of the present invention is to provide a non-rotating wheel cover, wherein when the wheel rotates, the indicia will not rotate with respect to the wheel so that people can see the indicia clearly.

To achieve above objects, the present invention provides a non-rotating wheel cover. The wheel cover can be mounted on an outer side of a wheel. The wheel cover comprises a retaining plate having a bearing at a center thereof; a periphery of the retaining plate being installed with a plurality of notches to not interfere with the locking studs of the wheel; a central shaft having a screw hole; the central shaft passing through the bearing of the retaining plate; a panel having a screw hole at a center thereof; an outer surface of the panel can be installed with an indicia; a weight being installed in an outer groove of the panel; and the lead block occupying over one third of the outer groove. Thereby when the wheel moves, since the panel is retained by the bearing and the weight is located within the outer groove of the panel, the indicia will not rotate with respect to the rotation of the wheel.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
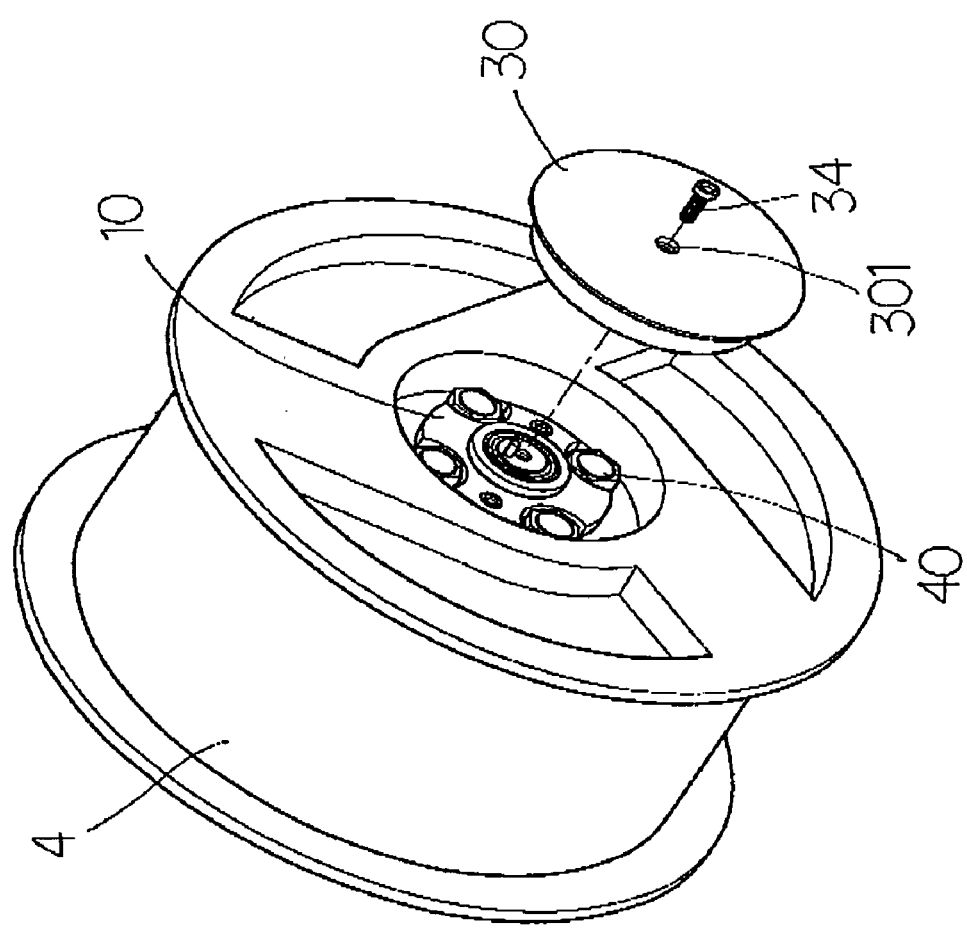
FIG. 1 is an exploded perspective view of the wheel cover of the present invention.
Figure 2:
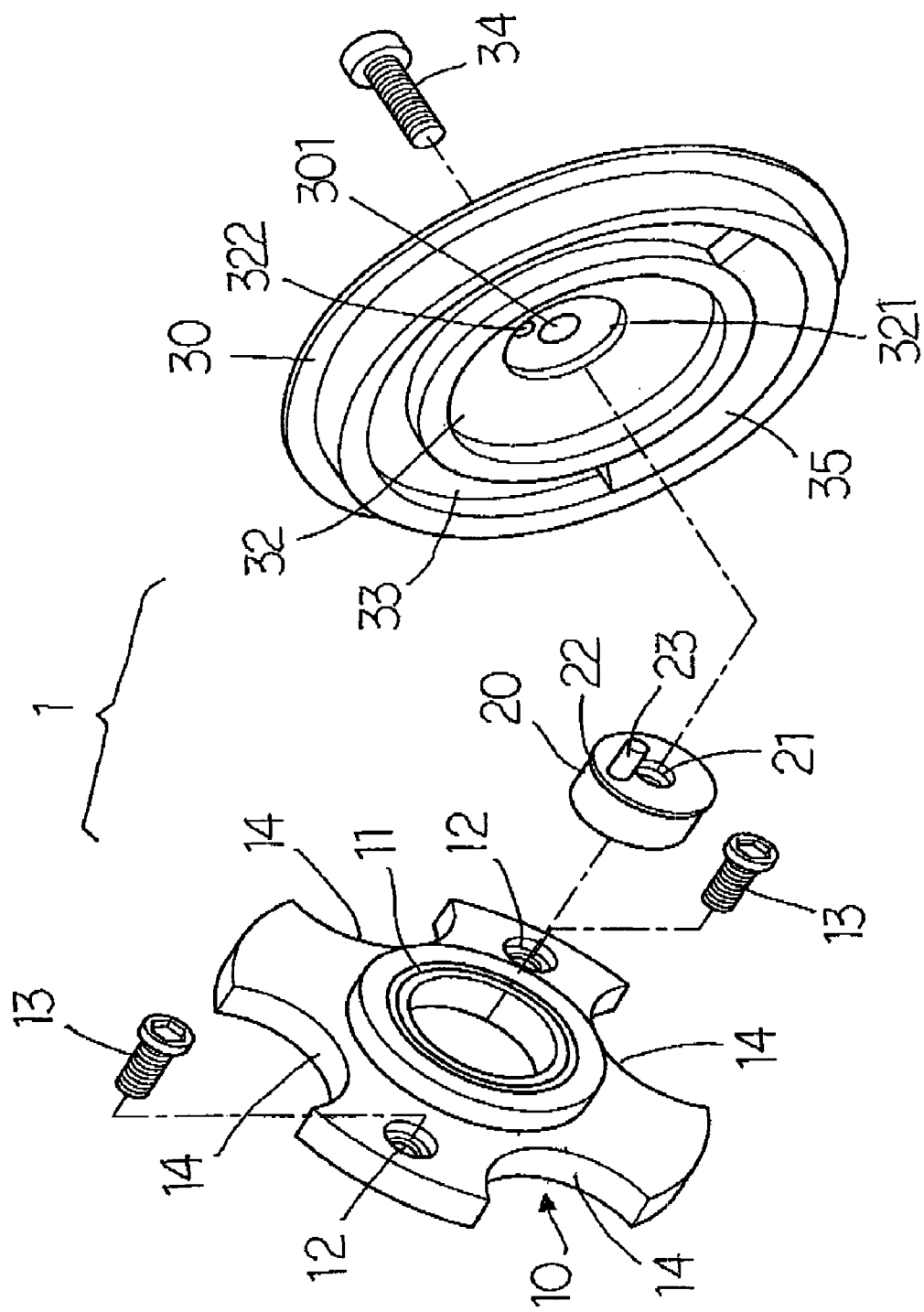
FIG. 2 is an exploded schematic view about the structure of the present invention.

With reference to FIGS. 1 and 2, the non-rotating wheel cover of the present invention is illustrated. The wheel cover 1 of present invention is mainly mounted on an outer side of a wheel 4. The wheel cover 1 contains the following elements.

A retaining plate 10 has a bearing 11 at a center thereof. Two positioning holes 12 are formed in the retaining plate 10. The two positioning holes 12 are formed at the two opposite sides of the bearing 11 and are capable of being locked to an outer side of a wheel 4 by a hexagonal screw 13. A periphery of the retaining plate 10 is installed with a plurality of notches 14 to not interfere with the locking studs 40 of the wheel 4.

A central shaft 20 has a screw hole 21. The central shaft 20 passes through the bearing 11 of the retaining plate 10. An end surface of the central shaft 20 is formed with a flange 22. A rivet 23 is embedded into the end surface.

A panel 30 has a screw hole 301 at a center thereof. An outer surface of the panel 30 can be installed with an indicia, for example, a vehicle indicia, especially a vehicle indicia of that car having the wheel. An inner surface of the panel 30 is formed with an inner groove 32 and an outer groove 33. The inner groove 32 serves for mounting on the retaining plate 10. A central portion of the inner groove 32 is formed with a shallow concave surface 321 for engaging the flange 22 of the central shaft 20. A rivet hole 322 is formed in the shallow concave surface 321 for receiving the rivet 23 at the outer surface of the panel 30. A hexagonal screw 34 passes through the screw hole 301 of the panel 30 to the central shaft 20. A weight 35 is installed in the outer groove 33. The weight 35 occupies a portion of the outer groove over one third of the outer groove 33.

Figure 3:
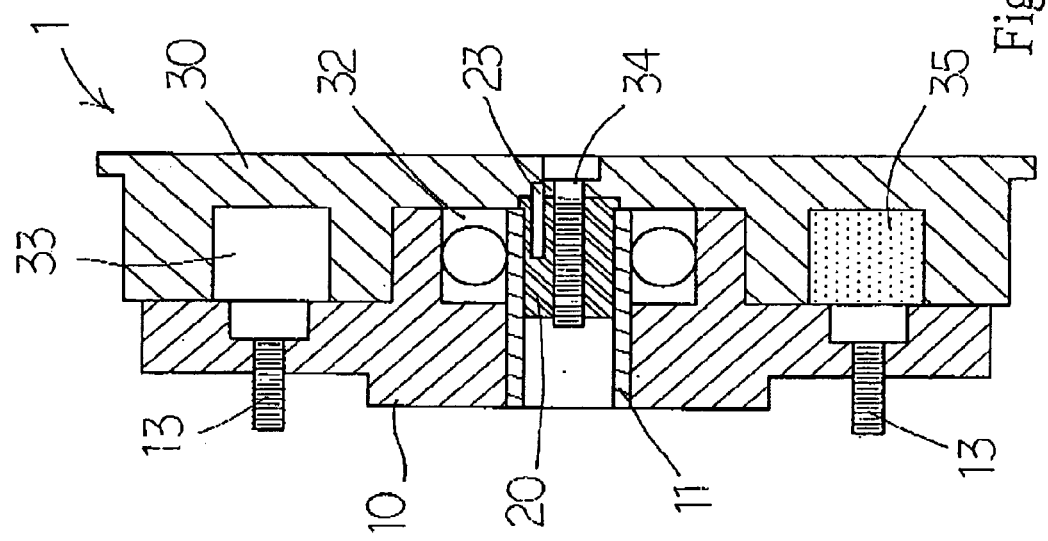
FIG. 3 is an assembly view of the present invention.
Figure 4:
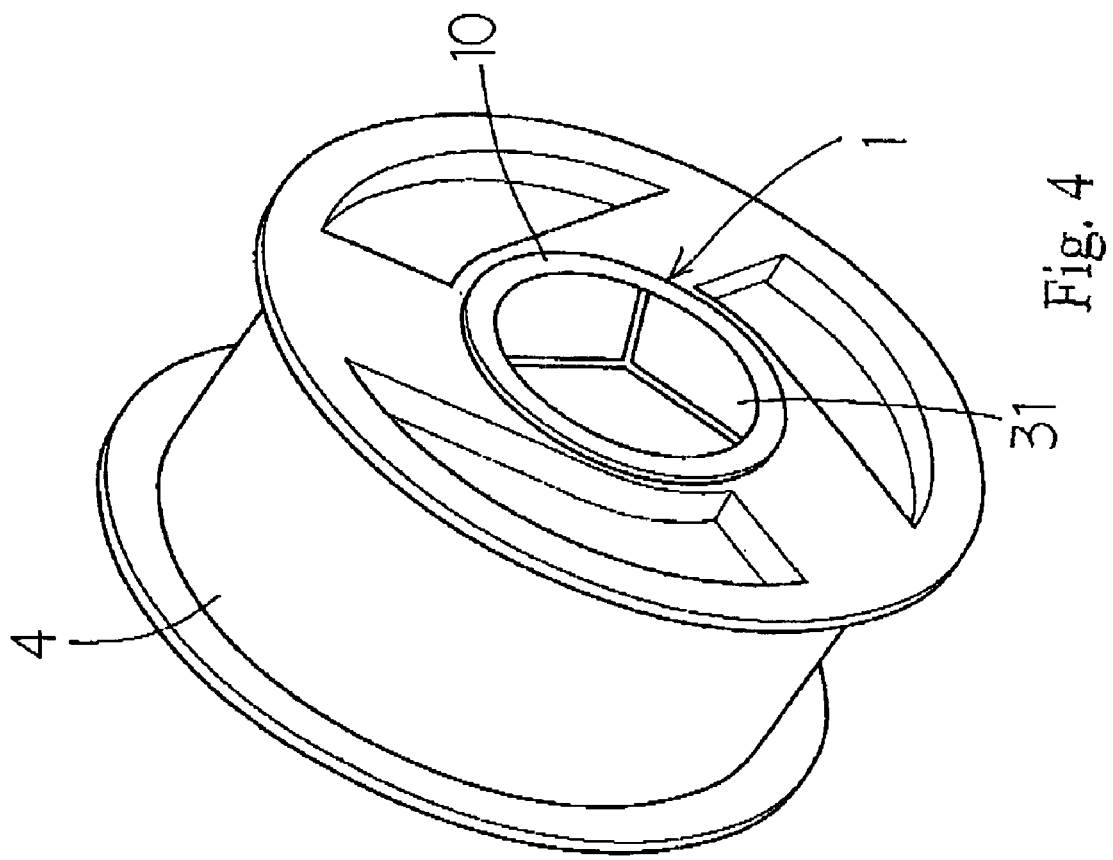
FIG. 4 is a schematic view showing the use of the present invention.

The assembly of the present invention will be described herein with reference to FIGS. 1, 3 and 4. In installation, the wheel cover 1 is installed on an outer center of the wheel 4. A hexagonal screw 13 passes through the positioning hole 12 of the panel 30 so as to fix the panel 30 to the wheel 4. The central shaft 20 is received into the bearing 11 of the panel 30. Then the shallow concave surface 321 is coupled to the flange 22 of the central shaft 20 and the inner groove 32 is coupled to the retaining plate 10. Then the hexagonal screw 34 passes through the hole 301 of the panel 30 to the screw hole 21 of the central shaft 20 so as to fix the panel 30 of the central shaft 20. Thereby the rivet 23 is inserted into the rivet hole 322 of the shallow concave surface 321. Then the assembly of the present invention is completed.

Figure 5:
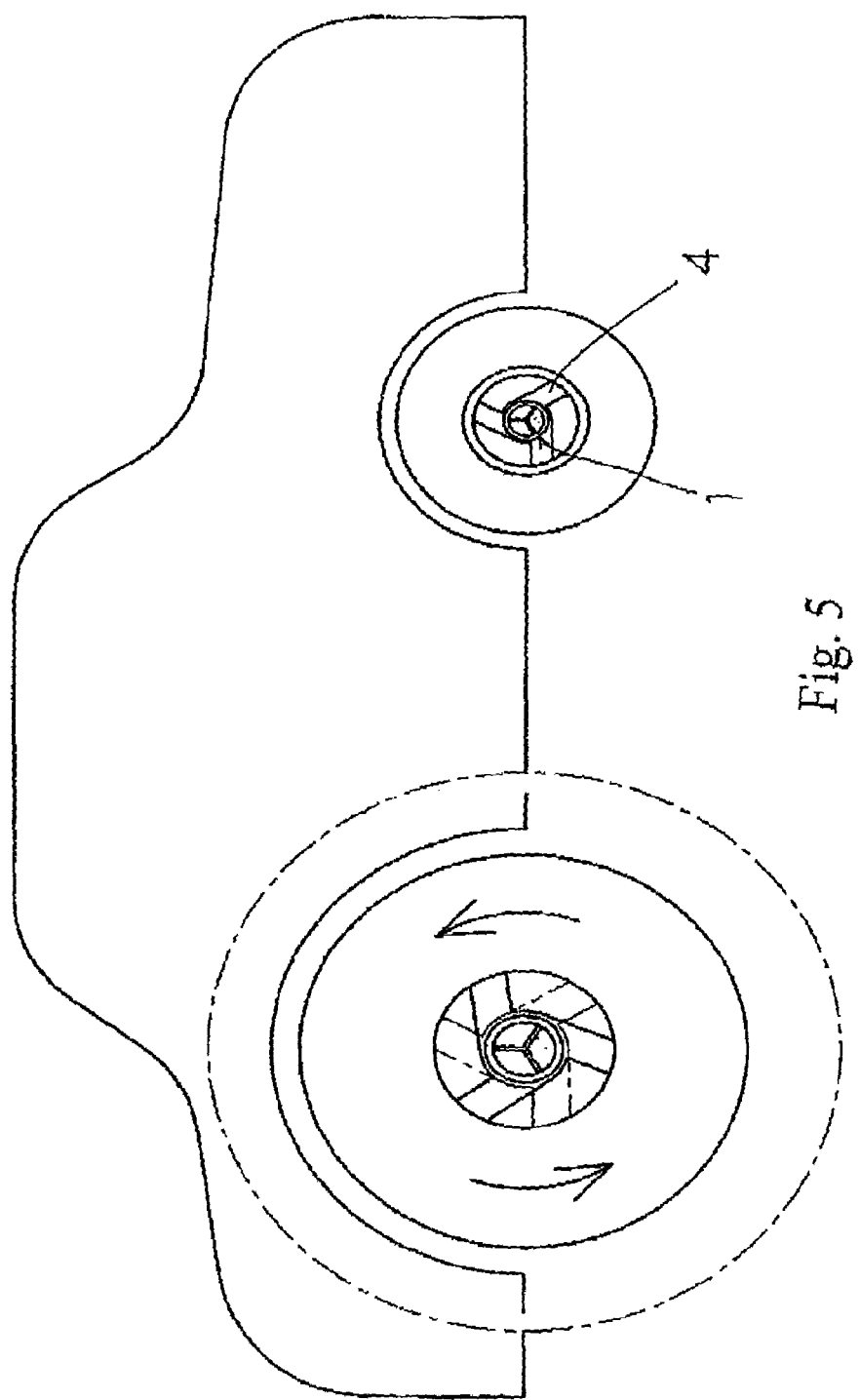
FIG. 5 is a schematic view showing the application of the present invention.

When the wheel rotates as a car having the wheel moves, the retaining plate 10 rotates with the wheel 4. The panel 30 is fixed to the central shaft 20, while the central shaft 20 is located in the bearing 11. Thus, the panel 30 will not rotate with the wheel. Since the weight 35 in the outer groove 33 is heavy, the panel 30 is retained in a non-rotation state with respect to the wheel. Thereby the indicia can be identified easily, as shown in FIG. 5.

Moreover, in the present invention, with the connection of the central shaft 20 and the bearing 11, the panel 30 will not rotate synchronously with the wheel 4. Moreover, by the bearing 11 in the outer groove 33 of the panel 30, the indicia is retained without rotation with respect to the wheel. Thus the indicia can be identified.

It should be noted that the number of the notches 14 in the periphery of the retaining plate 10 must be matched to that of the screw studs 40, for example, four to five.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A non-rotating wheel cover; the wheel cover being capable of being mounted on an outer side of a wheel; the wheel cover comprising:

a retaining plate having a bearing at a center thereof; two positioning holes formed in the retaining plate; the two positioning holes being formed at two opposite sides of the bearing and capable of being locked on the outer side of the wheel by a hexagonal screw; a periphery of the retaining plate being installed with a plurality of notches to not interfere with the locking studs of the wheel;

a central shaft having a screw hole; the central shaft passing through the bearing of the retaining plate; an end surface of the central shaft being formed with a flange; a rivet being embedded into the end surface;

a panel having a screw hole at a center thereof; and outer surface of the panel being installed with an indicia; and inner surface of the panel being formed with an inner groove and an outer groove; the inner groove serves for mounting on the retaining plate; a central portion of the inner groove being formed with a shallow concave surface for engaging the flange of the central shaft; a rivet hole being formed in the shallow concave surface for receiving the rivet at the outer surface of the panel; the hexagonal screw passing through the screw hole of the panel to the central shaft; a weight being installed in the outer groove; and the weight occupying a section having an area over one third of an area of the outer groove.

2. The non-rotating wheel cover as claimed in claim 1, wherein the indicia is a vehicle indicia.

3. The non-rotating wheel cover as claimed in claim 1, wherein the number of the notches in the periphery of the retaining plate is equal to that of the studs of the wheel for locking the wheel to the wheel.

* * * * *